United States Patent [19]

Matthies et al.

[11] 4,204,049

[45] May 20, 1980

[54] HYDROLYTIC POLYMERIZATION OF EPSILON-CAPROLACTAM

[75] Inventors: Paul Matthies, Heidelberg; Joachim Kunde, Frankenthal; Werner Hoerauf, Ludwigshafen, all of Fed. Rep. of Germany

[73] Assignee: BASF Aktiengesellschaft, Fed. Rep. of Germany

[21] Appl. No.: 11,647

[22] Filed: Feb. 12, 1979

Related U.S. Application Data

[63] Continuation-in-part of Ser. No. 743,515, Nov. 19, 1976, abandoned.

[51] Int. Cl.² .............................................. C08G 69/16
[52] U.S. Cl. .................................... 526/65; 528/323; 528/318
[58] Field of Search ........................... 528/323; 526/65

[56] References Cited

U.S. PATENT DOCUMENTS

| | | | |
|---|---|---|---|
| 2,241,323 | 5/1941 | Greenewalt | 528/323 |
| 3,044,993 | 7/1962 | Tiemersma | 528/323 |

*Primary Examiner*—Harold D. Anderson
*Attorney, Agent, or Firm*—Keil & Witherspoon

[57] ABSTRACT

An improved process for the continuous polymerization of ε-caprolactam in the presence of water as initiator in a vertical downward-flow tubular reactor, in which the ε-caprolactam is partially polymerized at elevated temperature in a first, mechanically agitated reaction zone and is further polymerized in further reaction zones to the desired degree of polymerization. Poly-ε-caprolactam is discharged in the form of a melt. The polymerization is carried out at a gauge pressure of from 0.2 to 0.9 bar, constant in all reaction zones. The temperature in the first reaction zone is maintained according to the relationship $t \leq 265 + 43\,p$ °C., where $p$ is the numerical value of the gauge pressure in bars which relationship is subject to the condition that the temperature be within the range of 260° to 295° C.

4 Claims, No Drawings

HYDROLYTIC POLYMERIZATION OF EPSILON-CAPROLACTAM

The present application is a continuation-in-part of application Ser. No. 743,515 which was filed on Nov. 19, 1976 and is now abandoned.

It is well known to manufacture poly-ε-caprolactam by continuous polymerization at elevated temperature and atmospheric pressure in vertical downward-flow polymerization tubes, so-called VK tubes, which may be subdivided into zones or sections. It is also kown to stir the lactam melt in the first polymerization zone by mechanical means (cf. German Published Application DAS No. 1,495,198). In this first polymerization zone, it is virtually impossible to exceed temperatures of 260° C., since otherwise the losses would be too great on account of the volatility of ε-caprolactam, particularly in the presence of water, and also the polymerization rate would fall considerably since some of the water used as initiator evaporates. Thus statements to the effect that the caprolactam melt is heated to from 240° to 280° C. may be understood only to mean that the melt is initially heated to about 240° to 250° C., the temperature being raised to more than 260° C. only as polymerization proceeds. The continuous polymerization of ε-caprolactam in VK tubes gives poly-ε-caprolactam of good quality but the process requires long reaction times, e.g. from 15 to 20 hours.

In addition to the continuous polymerization in VK tubes at atmospheric pressure, continuous processes are known which make use of one or more pressure stages. German Patent No. 916,589 describes a process for the continuous manufacture of polyamides in which the polymerizing melt passes a number of times from a stage of higher pressure to a stage of lower pressure. In this multi-stage process, the individual reaction stages are alternately interconnected by means for reducing and increasing the pressure. Such a method is complicated and is not readily applicable to VK tubes. British Patent 763,746 describes a process forthe continuous polymerization of ε-caprolactam in which polymerization is carried out in a sealed, completely filled vessel at elevated temperature and elevated pressure in the presence of not more than 1% of water as the sole agent for accelerating the reaction. Since this process operates without chain stoppers and must be followed by direct spinning, it is not suitable for universal use. The process is carried out at pressures of from 5 to 35 atmospheres, i.e. pressures for which conventional VK tubes are not built.

It is therefore desirable to accelerate the reaction in the continuous polymerization in VK tubes, in order to improve the space-time yield, although, of course, the quality of the polymer must remain unchanged compared with conventional polymers.

We have now found that ε-caprolactam is polymerized in a very much shorter time, in the presence of water as initiator, in a vertical, downward-flow tubular reactor in which the caprolactam is partially polymerized at elevated temperature in a first, mechanically agitated reaction zone and is further polymerized in further reaction zones to the desired degree of polymerization followed by discharge of molten poly-ε-caprolactam, if the polymerization is carried out at a gauge pressure of from 0.2 to 0.9 bar, constant in all reaction zones, and the temperature in the first reaction zone is maintained within the range of from 260° to 295° C. subject to the condition $t \leq 265 + 43\,p$ °C., where p is the numerical value of the pressure in bars.

The polymerization takes place in a vertical, downward-flow tubular reactor such as is frequently described in the literature as a VK tube. In the first polymerization zone, which takes up from about 20 to 40% of the volume of the tubular reactor, partial polymerization takes place to convert from about 20 to 70% of the caprolactam melt to polymer. In this first zone the melt is stirred mechanically. Polymerization is continued to the desired degree in a plurality of subsequent reaction zones in which the temperature is controlled fairly accurately, usually by means of heat exchangers, giving temperatures of from 260° to 300° C. in the second reaction zone, the temperature then being reduced in the subsequent zones until it is from about 240° to 280° C. at discharge. Said discharge may be carried out, for example, by means of worms or gear pumps. The polymer is then obtained in the form of a tape or filaments and granulated. Alternatively, a spinning unit may follow directly on the polymerization reactor.

In accordance with the present invention, a constant gauge pressure of from 0.2 to 0.9 bar and preferably from 0.25 to 0.75 bar is maintained in the reactor throughout, i.e. including the first polymerization zone. Strictly speaking, of course, different points of the reactor are at somewhat different pressures, since the static pressure of the liquid column is not negligible.

The values of the gauge pressure stated relate to the gas space above the first reaction zone. The pressure in the melt at each point is higher by the value of the hydrostatic pressure of the liquid column above said point. The melt is flashed to atmospheric pressure when discharged from the VK tube.

The gas space above the first reaction zone is filtered with caprolactam vapor, steam and, possibly, inert gases used for purging, e.g. nitrogen. The desired pressure may be obtained by increasing the temperature of the first reaction zone and sealing off the gas space from the atmosphere. Where purging gas is used, it is also possible to create the desired pressure by forcing in a suitable amount of purging gas and then raising the temperature to the desired value. The desired pressure may be maintained, for example by sealing off the gas chamber above the melt in the first reaction zone from the atmosphere by means of a dip tube provided at a suitable level. Alternatively, the pressure may be maintained constant by means of a regulator valve. The inert gases used for purging the gas chamber may escape through the dip tube or regulator valve.

In addition to the water required as initiator, use may be made of chain stoppers, accelerators, modifying co-monomers, stabilizers, delustrants and other additives in known manner.

Water is used, as initiator, in an amount of at least 0.2% by weight and preferably of from 0.4 to 0.7% by weight, based on the caprolactam introduced. Excess water can evaporate from the first reaction zone. Larger amounts of water than those stated are generally undesirable, since large additional amounts of heat must be applied to evaporate the excess water. However, larger amounts of water, for example up to 15%, may be used in special cases, for example as carriers for the introduction of one of the above additives, e.g. an accelerator or delustrant.

Due to the use of the said superatmospheric pressure, it is possible to maintain temperatures of more than 260° C. in the first polymerization zone without evaporating the water necessary for the progress of the polymerization. If the process is carried out at atmospheric pressure, these temperatures cannot be achieved in the first polymerization zone.

The process may be carried out using conventional VK tubes in which the first reaction zone is stirred mechanically and the temperature in the subsequent polymerization zones is controlled relatively accurately within the limits stated. Conventional baffles may be used to control the flow pattern.

Our novel process makes it possible to operate VK tubes in an extremely flexible manner and in particular to increase the polymerization capacity thereof, i.e. improve the space-time yield, at very low equipment costs. The process is further illustrated with reference to the following Examples. To characterize the products, the solution viscosity was determined after extracting the low molecular weight portions with hot water and drying the product. The said viscosity is given as the relative viscosity of a 1% solution of the polyamide in 96% sulfuric acid at 25° C.

Polycaprolactam obtained by the process of the invention is suitable for the manufacture of filaments, fibers, wire and injection molded or extruded shaped articles.

EXAMPLE 1

Use was made of a heated VK tube in which the top (first) reaction zone was agitated by means of a stirrer and the temperature in the reaction zones below said first reaction zone may be controlled by means of heat exchangers. The superatmospheric pressure was adjusted by means of a dip tube between the gas chamber above the first reaction zone and the atmosphere. The capacity of the VK tube was 270 liters, the first, stirred, reaction zone occupying 70 l.

Molten caprolactam having a content of 0.5% by weight of water was fed to the top of the VK tube at a gauge pressure of 0.26 bar and at a rate of 22 kg/hr. The temperature in the first, stirred, reaction zone was 270° C. The heat of polymerization liberated in the subsequent reaction zones was removed by appropriate cooling using heat exchangers so that the temperature of the melt entering the discharge pump was again 270° C. The product had a content of extractable low molecular weight portions of 12.7% and a relative viscosity of 3.01 (after extraction and drying). The properties were approximately the same as those of the product obtained in the following comparative test.

The comparative test was carried out at atmospheric pressure, a feed rate of 18 kg/hr and a temperature of 257° C. in the first reaction zone, all other conditions being identical. The content of extractables was 12.4% and the relative viscosity was 3.03. Thus the conditions used in Example 1 provide an increase in polymerization capacity from 18 to 22 kg/hr, i.e. about 22%.

EXAMPLE 2

Molten caprolactam having a content of from 0.5% by weight of water as initiator and 0.15% by weight of propionic acid as chain stopper was fed to the VK tube of Example 1 at a rate of 20 kg/hr and a gauge pressure of 0.26 bar. The temperature in the first reaction zone was 270° C. and the temperature of the product entering the discharge pump was 266° C. The product had a content of extractables of 10.9% and a relative viscosity of 2.59.

EXAMPLE 4

The test of Example 2 was repeated at a temperature of 274° C. in the first reaction zone, all other conditions being identical. The product had a content of extractables of 12.6% and a relative viscosity of 2.67. Increase in the temperature of the first reaction zone from 270° to 274° C. caused, therefore, a certain increase in the content of extractables. Further increase in the temperature beyond that given by the relationship $t \leq 265 + 43 \, p$ ($t = 276.1°$ C. at 0.26 bar) leads to a further increase in the content of extractables, which is undesirable.

EXAMPLE 4

Caprolactam having a content of 0.5% of water and 0.15% of propionic acid was fed to the VK tube of Example 1 at a rate of 30.5 kg/hr and a gauge pressure of 0.75 bar. The temperature in the first reaction zone was 288° C. and that of the melt entering the discharge pump was 270° C. The product had a content of extractables of 12.3% and a relative viscosity of 2.50. No damage to the product was discernible and the color of the product was satisfactory.

We claim:

1. In a process for the continuous polymerization of ε-caprolactam in the presence of water as an initiator in a vertical downward-flow tubular reactor in which the ε-caprolactam is partially polymerized at elevated temperature in a first reaction zone, mechanically agitated, and is further polymerized in further reaction zones until the desired degree of polymerization into a fiber-forming polymer has been achieved, the resulting molten poly-ε-caprolactam the being discharged, the improvement which consists of carrying out the polymerization at a gauge pressure of from 0.2 to 0.9 bar, constant in all reaction zones, and converting from 20 to 70% of the ε-caprolactam into polymer in said first reaction zone while maintaining the temperature in the first reaction zone according to the relationship $t \leq 265 + 43 \, p$°C., where p is the numerical value of the gauge pressure in bars which relationship is subject to the condition that the temperature in the first reaction zone must be within the range of 260° to 295° C.

2. The process of claim 1 wherein the temperature in the second reaction zone is from 260° to 300° C. and the temperature in subsequent zones is reduced progressively until it has a value of from 240° to 280° C. at discharge.

3. The process of claim 1 wherein the gauge pressure used is from 0.25 to 0.75 bar.

4. The process of claim 1 wherein water is used as the initiator in an amount of from 0.4 to 0.7% by weight, based on the amount of caprolactam used.

* * * * *